March 8, 1927.  E. BUGATTI  1,620,323
ELASTIC AXLE FOR MOTOR VEHICLES
Original Filed Oct. 5, 1923   2 Sheets-Sheet 1
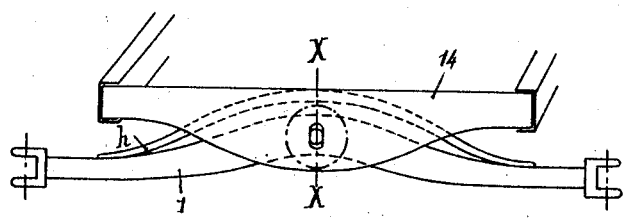
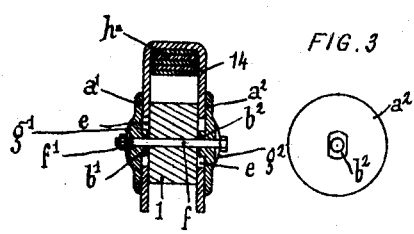
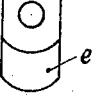
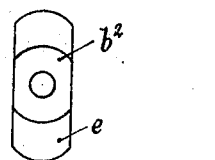
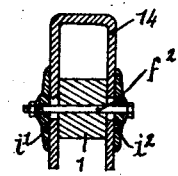
Inventor,
Ettore Bugatti,
atty.

March 8, 1927. 1,620,323
E. BUGATTI
ELASTIC AXLE FOR MOTOR VEHICLES
Original Filed Oct. 5, 1923  2 Sheets-Sheet 2
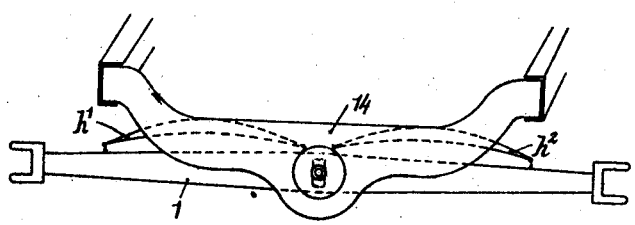
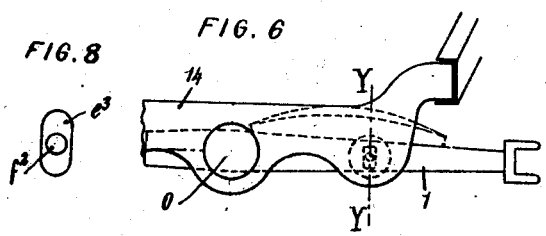
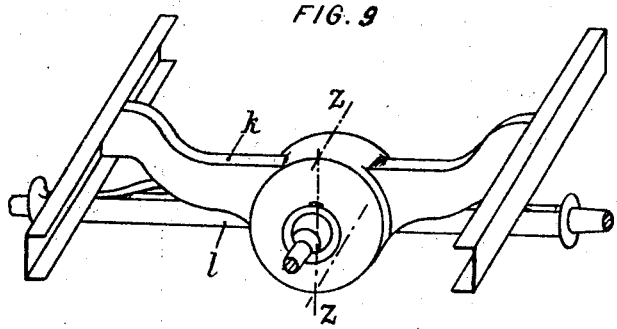
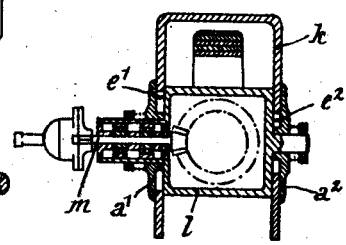
Inventor
Ettore Bugatti Patented Mar. 8, 1927.

1,620,323

UNITED STATES PATENT OFFICE.

ETTORE BUGATTI, OF MOLSHEIM, FRANCE.

ELASTIC AXLE FOR MOTOR VEHICLES.

Original application filed October 5, 1923, Serial No. 666,768, and in France October 13, 1922. Divided and this application filed June 1, 1925. Serial No. 34,244.

The present invention relates to the following improvements of the axle arrangements described in my Patent 1,551,798 of Sept. 1st, 1925, granted on my application, Serial No. 666,768, filed October 5, 1923, from which the present application is a divisional one:

(a) The front cross-piece of the vehicle frame has a U-shape and partially surrounds the axle, according to an arrangement which is the inverse of the arrangement described in the aforesaid application.

(b) The axle is guided in its movement by means of bosses movable in vertical slots in the said cross-piece, the said bosses being secured to cheeks assembled by an axle or spindle extending through the vehicle axle and having the latter pivoted thereon.

(c) One or more plate springs or undulated springs are interposed between the said cross-piece and the vehicle axle.

(d) The application to the rear axle of the vehicle of an arrangement analogous to what is employed for the front axle.

(e) The devices for damping the motion of the axle consist of the cheeks referred to in paragraph (b), the friction surfaces of the damping device being formed by the internal faces of the cheeks, the internal and external faces of both walls of the cross-piece, and the front and rear faces of the vehicle axle.

The following description and appended drawings which are given by way of example set forth the present invention.

Fig. 1 is a perspective view of one form of the axle arrangement.

Fig. 2 is a section on the line X—X of Fig. 1.

Fig. 3 is a front view of a cheek on a larger scale.

Fig. 4 shows a detail on a larger scale of the boss of a cheek and of the slot wherein it is movable.

Fig. 5 is a perspective view of a modification.

Fig. 6 is a half-view in perspective of another modification.

Fig. 7 is a section on the line Y—Y of Fig. 6.

Fig. 8 is a front view of the slot shown in section in Fig. 7.

Fig. 9 is a perspective view of a rear axle combination which is constructed in accordance with the present invention.

Fig. 10 is a section of the line Z—Z of Fig. 9.

As observed in Figs. 1 and 2, the front cross-piece 14 of the vehicle frame may be constituted by an inverted U-shaped sheet metal member having movable therein in a vertical place the central portion of the front vehicle axle 1; said axle is connected with the vehicle frame by the two discs $a^1$ $a^2$ disposed on either side of the cross-piece 14 and whereof the internal faces are provided with the bosses $b^1$, $b^2$ having two flat sides, Figs. 3 and 4; said bosses are slidable in the slots $e$ of the cross-piece 14, and a spindle or bolt $f$ traversing the vehicle axle 1, serves to assemble the two cheeks. The height of the bosses $b^1$ $b^2$ is such that they will not come into contact with the axle 1, Fig. 2, when the nut $f^1$ screwed upon the bolt $f$ is used to press the cheeks $a^1$ $a^2$ against the vehicle frame 14.

In this manner, the cheeks $a^1$ $a^2$ will constitute a central damping device for the oscillations of the axle about the axis of the bolt $f$, and to this end, elastic clamping means, for example the elastic locking washers $g^1$ $g^2$, Fig. 2, are provided between each cheek and the bolt $f$ or nut $f^1$. The surfaces of the damping device are formed by the internal face of the cheeks, the internal and external faces of the cross-piece 14 and the front and rear faces of the axle 1.

The elastic connection between the cross-piece 14 and the axle is ensured by one or more plate springs $h$ interposed between the inner end of the U formed by the front cross-piece 14 and the upper face of the axle 1. The two outer ends of the spring $h$ rest freely upon the top of the axle and are slidable thereon; they might be secured to the axle by shackles, without any change in the operation of the device.

In the modification shown in Fig. 5, the front axle 1 has a straight form whilst the cross-piece 14 extends downwardly; the figure represents two plate springs $h^1$ $h^2$ provided with shackles and interposed between the said cross-piece and the axle, but provision might be made for three, four, five or more plate springs.

In Fig. 6, lateral shock-absorbers or damping devices are provided, these being shown in section in Fig. 7. The vehicle axle 1 is guided in the cross-piece 14 and it oscillates in the downward direction with friction at its centre O; it draws with it the bolt $f^2$ of the lateral shock-absorber whose ends are secured to the cheeks $i^1$ and $i^2$ which are in contact on either side with the cross-piece 14. A slot $e^3$ is provided in the cross-piece 14 for the play of the bolt $f^2$, said slot, Fig. 8, is comparatively wider than the slot $e$ of the central shock-absorber, since in this case the bolt $f^2$ does not serve as a pivot.

In Fig. 9 the arrangement according to the present invention is adapted to the rear axle portion of a vehicle. The cross-piece $k$ of the vehicle frame is enlarged at the middle part so that the rear axle $l$ may be disposed therein, Fig. 10. In the same manner as for the front axle, the said rear axle is guided in its vertical motion by the slots $e^1$ $e^2$ whose form is analogous to that of the slot $e$, Fig. 4. The cheeks $a^1$ $a^2$ act in like manner as shock-absorbers; a central aperture is simply formed in the cheek $a^1$ for the passage of the Cardan device $m$.

What I claim is:

1. The combination of an axle for motor vehicles, a cross-piece of the vehicle frame situated at the level of the axle and having the form of an inverted U throughout its whole length and surrounding for a considerable length the axle disposed in the said cross piece, the axle being mounted without play and with easy friction in the interior of the cross-piece.

2. The combination of an axle for motor vehicles, a cross-piece of the vehicle frame situated at the level of the axle and having the form of an inverted U throughout its entire length and fitted upon either side of the said axle, means whereby the axle is mounted by easy friction in the interior of the cross-piece, a spindle traversing said axle and extending through two vertical slots in the wall of the said cross-piece, cheeks mounted on the respective sides of the said axle and carrying bosses slidable in the said slots in the cross-piece, and elastic means disposed between the closed side of the cross-piece and the upper part of the axle.

3. The combination of an axle for motor vehicles, a U-shaped cross-piece of the vehicle frame situated at the level of the axle and partially surrounding said axle, a spindle secured to the axle and extending through vertical slots formed in the said cross-piece, cheeks mounted upon said spindle and disposed on either side of said cross-piece in such manner as to provide for the damping of the motion of the said axle with reference to said cross-piece and to guide the movement of said axle with respect to the vehicle frame.

In testimony that I claim the foregoing as my invention, I have signed my name hereto.

ETTORE BUGATTI.